United States Patent
Bach et al.

[11] Patent Number: 6,039,634
[45] Date of Patent: Mar. 21, 2000

[54] HARDENED WORKPIECE FINISHING PROCESS

[75] Inventors: Guenther Bach; Heinz Naumann, both of Besigheim, Germany

[73] Assignee: Komet Praezisionswerkzeuge Robert Breuning GmbH, Germany

[21] Appl. No.: 08/878,851

[22] PCT Filed: Dec. 16, 1995

[86] PCT No.: PCT/EP95/05017

§ 371 Date: Jun. 20, 1997

§ 102(e) Date: Jun. 20, 1997

[87] PCT Pub. No.: WO96/19317

PCT Pub. Date: Jun. 27, 1996

[30] Foreign Application Priority Data

Dec. 21, 1994 [DE] Germany .............................. 44 45 621

[51] Int. Cl.[7] ...................................................... B24B 1/00
[52] U.S. Cl. ................................ 451/49; 451/51; 451/58; 451/57; 451/61
[58] Field of Search .................................. 451/51, 57, 64, 451/49, 65, 58, 66, 461, 487, 61, 363, 362

[56] References Cited

U.S. PATENT DOCUMENTS

| | | |
|---|---|---|
| 4,461,121 | 7/1984 | Motzer et al. .................................. 51/3 |
| 4,593,444 | 6/1986 | Kavthekar .................................... 29/27 |

FOREIGN PATENT DOCUMENTS

| | | |
|---|---|---|
| 0512956 | 11/1992 | European Pat. Off. . |
| 736496 | 11/1932 | France . |
| 1 284 867 | 12/1968 | Germany . |
| 32 02 723A1 | 9/1982 | Germany . |
| 87 11 828 | 3/1988 | Germany . |
| 38 24 602A1 | 1/1990 | Germany . |
| 38 43 795C2 | 6/1990 | Germany . |
| 41 127 63 | 10/1991 | Germany . |
| 41 07 462A1 | 9/1992 | Germany . |
| 4-25332 | 1/1992 | Japan . |
| 384937 | 1/1933 | United Kingdom . |

*Primary Examiner*—Timothy V. Eley
*Attorney, Agent, or Firm*—Flynn, Thiel, Boutell & Tanis, P.C.

[57] ABSTRACT

A process finishes the surface of rotationally symmetrical workpieces. The workpiece is pre-machined and hardened with a stock allowance and is then finished in two steps in a device in which it is clamped only once. The largest part of the stock allowance is first cut by a hard turning process and the residue is then ground down to the actual size of the workpiece to be manufactured. The device for performing this process includes a motor-driven workpiece spindle for receiving the workpiece having a spindle head. The workpiece spindle has at least one motor-driven grinding spindle adapted to accept a grinding tool. The grinding spindle generally is axially aligned with the workpiece spindle or the workpiece thereon. The workpiece spindle can be fitted with a lathe tool having a cutting edge for hard turning.

18 Claims, 1 Drawing Sheet

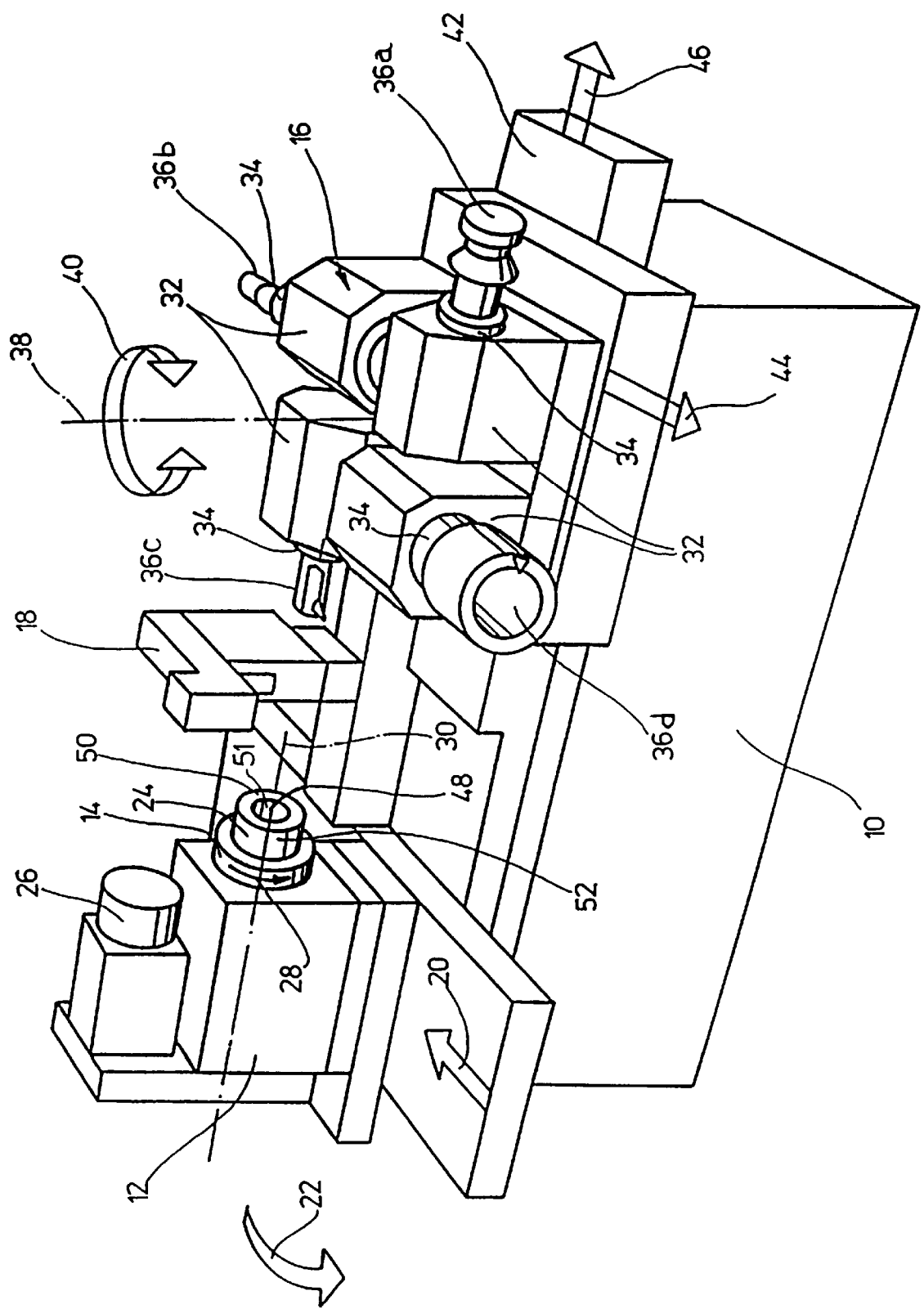

HARDENED WORKPIECE FINISHING PROCESS

FIELD OF THE INVENTION

Background of the Invention

The invention is related to a method and a device for finishing hardened workpieces.

Workpieces made of steel are regularly premachined by turning, drilling and/or milling in their non-hardened state and hardened only afterwards. In order to be able to compensate dimensional changes and warping occuring during the hardening, the workpieces are premachined leaving an overmeasure, which is removed by grinding during the following finishing of the workpiece in the hardened state. During the internal grinding of bores the grinding tool is advanced into the bore of the workpiece which rotates about the spindle axis with a protruding grinding spindle, and the grinding tool is advanced perpendicular to the axis of rotation of the grinding tool against the bore wall to be machined. In this position, the grinding tool is displaced oscillating axially and brought to the feeding measure in the perpendicular feeding direction. The feeding is performed in steps until the final measure is achieved. The external grinding or the plane facing of workpieces is performed correspondingly, wherein the feeding movement is always performed perpendicularly with respect to the surface until the final measure is achieved and the oscillating movement is performed in a parallel direction. These processes are usually controlled numerically.

Grinding processes are very time consuming and therefore expensive. This is true especially for the internal grinding of relatively small bore diameters.

Based on this, it is the object of the invention to develop a method and a device of the type described above, with which a considerable time saving during the finishing of hardened workpieces may be achieved.

SUMMARY OF THE INVENTION

The solution according to the invention is based on the idea that a considerable part of the overmeasure may be removed by hard-turning in a much shorter time than by grinding and that only in places with correspondingly high demands with respect to the precision and surface quality the finishing is performed with a corresponding small rest removal by grinding. In order to achieve this, it is proposed according to the invention that before the grinding process a lathe tool is exchanged into a coaxially aligned position with respect to the workpiece spindle and/or the rotationally symmetrical workpiece surface to be machined in place of the grinding tool, the lathe tool being rotated about an axis which is aligned with respect to the axis of the workpiece spindle and being advanced axially in the direction of the workpiece while effecting a machining which removes part of the overmeasure. In this, it is essential that the hard turning and grinding are performed during one and the same clamping of the workpiece.

The grinding tool and the lathe tool are advantageously rotated about a common shift axis which is perpendicular to the momentary tool axis and to the axis of the workpiece spindle, and they are alternatively aligned in the direction of the workpiece spindle.

According to a preferred embodiment of the invention it is provided that the rotational drive of the workpiece spindle is switched off during the rotational machining. Due to the relatively high masses which have to be moved and the small cutting forces transferred to the workpiece, the workpiece spindle can remain unbraked during the lathing process and be slowly taken along in the direction of rotation without disadvantages. It is basically possible, though, to brake the workpiece spindle during the lathing operation or to lock it against rotation using simple means. Conversely, it is also possible to work with a fixed lathe tool and to rapidly rotate the workpiece using a correspondingly designed spindle drive. Depending on the requirements with respect to the precision and surface quality, 70% to 90% of the overmeasure are removed by hard turning and only the remaining rest of 30% to 10% is removed by grinding according to the invention in workpieces made of hardened steel. When taking into consideration that the removal during hard turning occurs approximately 10 times as fast as during grinding, and taking into consideration further steps, such as clamping and measuring, the cycle times during the finishing may be reduced by more than one half.

According to a further development of the method according to the invention the cutting radius of the lathe tool is adjusted during the rotational machining. By this measure even complicated contours can be machined into the workpiece during the hard turning, and a high precision and surface quality can be achieved in the following grinding process at the relevant places of the workpiece.

In a preferred device for executing the method according to the invention, which has a motor-driven workpiece spindle for accepting a premachined, hardened workpiece and a spindle head which is displaceable with respect to the workpiece spindle and which has at least one, preferably at least two motor-driven grinding spindles for accepting the grinding tool, at least one of the grinding spindles can be axially aligned with respect to the workpiece spindle or the rotationally symmetric surface of a workpiece which is clamped into the workpiece spindle, and can be fitted with a lathe tool. The measures according to the invention may, for instance, be retrofitted to an existing grinding machine having a multi-spindle head, when this grinding machine enables the possibility to align and adjust the multi-spindle head with respect to the spindle carrier, which is usually not needed during the grinding process. The alignment position of the multi-spindle head may be stored in an existing NC-control of the grinding machine and be recalled when selecting the grinding spindle which carries the lathe tool. To this end, the multi-spindle head is advantageously formed to be a revolver head which can be rotated about a shift axis which is perpendicular with respect to the workpiece spindle, which revolver head may be positioned on a NC-controlled cross slide. In this, the lathe tool may be formed to be a drill shank having a cutting edge for internal or external hard turning. In order to machine the contours, the lathe tool may be formed to be a plane facing or turn-out head having an adjusting drive as an additional NC-axis for a hard-turning cutting edge.

Additional possible uses are attained when the spindle carrier which carries the workpiece spindle is adjustable about an axis which is parallel to the shift axis of the revolver head.

BRIEF DESCRIPTION OF THE DRAWING

In the following, the invention is described with reference to an embodiment schematically shown in the drawing.

The only FIGURE shows a diagrammatical representation of a grinding machine having a horizontal multi-spindle revolver head for grinding and lathe tools.

DETAILED DESCRIPTION

The grinding machine shown in the drawing consists essentially of a machine foundation 10, a spindle carrier 12 having a workpiece spindle 14, a multi-spindle revolver head 16 having a vertical shift axis 38, and a trimming device 18 which is disposed between the spindle carrier and the revolver head on the machine foundation.

The spindle carrier 12 is disposed on the machine foundation transversely displaceable in the direction of the arrow 20 and adjustable about a vertical axis in the direction of the arrow 22. The workpiece spindle 14 may be fitted with the workpiece 24 to be machined and is rotatably borne in the spindle carrier 12 about the horizontal spindle axis 30 in the direction of the arrow 28 by a drive motor 26.

In the depicted embodiment, the revolver head 16 has four spindle units 32 with an integrated drive device and a driven grinding spindle 34 for accepting tools 36a, 36b, 36$^{IV}$, 36c, 36d. The tools which protrude over the grinding spindles 34 are a surface grinding mandril 36a, an internal grinding mandril 36b, a drill shank 36c for internal hard turning, and a drill shank 36d for external hard turning. The selection of the individual tools is effected by turning the revolver head 16 about the shift axis 38 in the direction of the arrow 40. The revolver head 16 may further be displaced transversely and along the machine foundation 10 in the direction of the arrows 44 and 46 by means of a cross slide 42.

The workpiece 24 is a rotationally symmetric, premachined and hardened steel part having a central bore 48, a plane face 50, a cylindrical outer surface 52 and an overmeasure. During the finishing an overmeasure in the wall 51 of the bore 48 is at first removed to reach approximately 80% of the final measure with the aid of the internal lathe tool 36c. Following this, the overmeasure in the region of the outer surface 52 is removed to achieve approximately 80% of the final measure using the external lathe tool 36d. In these lathing processes the corresponding tools 36c and 36d are aligned with their spindles 34 to the workpiece spindle axis 30 by means of a NC-control (not shown) and the drive motor 26 of the workpiece spindle 14 is stopped. During the following finishing, the inner wall of the bore 48 is machined to the final measure by selecting the internal grinding mandril 36b and the plane face 50 is then machined by selecting the surface grinding mandril 36a. The grinding body of the grinding mandril 36a and/or 36b is measured before a grinding process with the aid of the trimming device 18 and readjusted and/or refinished, thereby compensating the previously occuring wear.

In summary, the following can be stated: The invention is related to a method and a device for finishing rotationally symmetric workpiece surfaces. The finishing of the premachined and hardened workpiece having an overmeasure is effected according to the invention in a grinding machine in two steps with a single clamping of the workpiece: At first a larger part of the overmeasure is removed by hard turning and then the smaller part is ground until achieving the final measure.

The embodiments of the invention in which an exclusive property or privilege is claimed are defined as follows:

1. A method for finishing rotationally symmetrical workpiece surfaces, wherein a hardened workpiece which has been premachined leaving an overmeasure is clamped into a rotationally driven workpiece spindle of a grinding machine and is machined using a grinding tool effecting the removal of part of the overmeasure, the grinding tool rotating about a tool axis which is variably eccentric with respect to the workpiece spindle and/or to the rotationally symmetrical workpiece surface to be machined, the grinding tool further being advanceable perpendicularly to the workpiece surface and being oscillatingly displaceable parallel with respect to the workpiece surface, and wherein before the grinding process a lathe tool comprising a drill shank having a cutting edge for internal hard turning or for external hard turning is exchanged into a coaxially aligned position with respect to the workpiece spindle and/or the rotationally symmetrical workpiece surface to be machined in place of the grinding tool, the lathe tool being rotated about an axis which is aligned with respect to the axis of the workpiece spindle and being advanced axially in the direction of the workpiece while effecting a machining which removes part of the overmeasure.

2. The method of claim 1, characterized in that the rotational drive of the workpiece spindle is switched off during the rotational machining.

3. The method of claim 2, characterized in that the workpiece spindle is carried along in the direction of rotation of the lathe tool without braking during the rotational machining.

4. The method of claim 2, characterized in that the workpiece spindle is braked or locked in the direction of rotation during the rotational machining.

5. The method of claim 1, characterized in that the grinding tool and the lathe tool are rotated about a common shift axis which is perpendicular to the momentary tool axis and to the axis of the workpiece spindle, and alternatively aligned in the direction of the workpiece spindle.

6. The method of claim 1, characterized in that the cutting edge radius of the lathe tool is adjusted during the rotational machining.

7. The method of claim 1, wherein 70% to 90% of the overmeasure of the hardened workpieces is removed by means of hard turning and the rest by means of grinding.

8. A method for finishing rotationally symmetrical workpiece surfaces comprising the steps of:

clamping a hardened rotationally symmetrical workpiece into a rotationally driven workpiece spindle of a machine, the hardened rotationally symmetrical workpiece having a rotationally symmetrical workpiece surface and being premachined to leave an overmeasure;

aligning a lathe tool into a coaxially aligned position with respect to the workpiece spindle and/or the rotationally symmetrical workpiece surface to be machined;

rotating the lathe tool about an axis that is aligned with respect to the axis of the workpiece spindle;

advancing the lathe tool axially in the direction of the workpiece to hard turn the rotationally symmetric workpiece surface of the workpiece and remove part of the overmeasure;

moving the lathe tool away from the rotationally symmetrical workpiece after the removal of part of the overmeasure;

rotating a revolver head of the machine to align a grinding tool with the workpiece spindle, the grinding tool rotating about a tool axis which is aligned with respect to the axis of the workpiece spindle;

advancing the grinding tool toward the rotationally symmetrical workpiece to grind the rotationally symmetrical workpiece surface of the workpiece and remove a remaining part of the overmeasure and finish the workpiece; and moving the grinding tool away from the rotationally symmetrical workpiece after finishing of the workpiece, wherein the workpiece is not unclamped from the workpiece spindle until completion of the finishing of the workpiece and the removal of the overmeasure from the workpiece.

9. The method of claim 8, including the step of oscillatingly displacing the grinding tool in a direction parallel with respect to the workpiece surface.

10. The method of claim 8, wherein the rotational drive of the workpiece spindle is switched off during the rotational machining.

11. The method of claim 8, the hard turning removing from 70% to 90% of the overmeasure and the grinding removing the rest of the overmeasure.

12. The method of claim 8, wherein the workpiece spindle is braked or locked in the direction of rotation during the rotational machining.

13. The method of claim 8, the hard turning of the lathe tool comprising internal hard turning for removing the overmeasure from the rotationally symmetrical surface of an inner wall of the rotationally symmetric workpiece.

14. The method of claim 14, the grinding by the grinding tool comprising internal grinding for removing remaining overmeasure from the rotationally symmetrical surface of the inner wall of the workpiece.

15. The method of claim 14 including the additional steps of:
    rotating the revolver head of the machine to align a second lathe tool with the workpiece spindle, the second lathe tool rotating about a second tool axis which is aligned with respect to the axis of the workpiece spindle;
    rotating the second lathe tool about the second tool axis that is aligned with respect to the axis of the workpiece spindle;
    advancing the second lathe tool axially in the direction of the workpiece to hard turn an outer rotationally cylindrical symmetric workpiece surface of the workpiece and remove part of the overmeasure therefrom;
    moving the second lathe tool away from the rotationally symmetrical workpiece after the removal of part of the overmeasure from the outer rotationally cylindrical symmetric workpiece surface;
    rotating the revolver head of the machine to align a second grinding tool with the workpiece spindle, the second grinding tool rotating about a second axis which is aligned with respect to the axis of the workpiece spindle;
    advancing the second grinding tool toward the outer rotationally symmetrical workpiece to grind the outer rotationally cylindrical symmetrical workpiece surface of the workpiece to remove a remaining part of the overmeasure and finish the outer rotationally cylindrical symmetrical workpiece surface; and
    moving the second grinding tool away from the rotationally symmetrical workpiece after finishing of the outer rotationally cylindrical symmetrical workpiece surface.

16. The method of claim 8, the hard turning of the lathe tool comprising external hard turning for removing the overmeasure from the rotationally symmetrical surface comprising an outer cylindrical surface of the workpiece.

17. The method of claim 8, including positioning the grinding tool eccentric with respect to the workpiece spindle and/or the rotationally symmetrical workpiece surface.

18. The method of claim 8, wherein the lathe tool comprises a boring rod with a cutting blade for internal hard turning of the rotationally symmetrical workpiece.

* * * * *

UNITED STATES PATENT AND TRADEMARK OFFICE
CERTIFICATE OF CORRECTION

PATENT NO : 6 039 634
DATED : March 21, 2000
INVENTOR(S) : Guenther BACH et al

It is certified that error appears in the above-identified patent and that said Letters Patent are hereby corrected as shown below:

Column 5, line 17; change "claim 14" to ---claim 13---.

Signed and Sealed this

Tenth Day of April, 2001

Attest:

NICHOLAS P. GODICI

*Attesting Officer*    *Acting Director of the United States Patent and Trademark Office*